United States Patent Office 3,478,033
Patented Nov. 11, 1969

3,478,033
PREPARATION OF 1,1,4,4-TETRAETHYL-PIPERAZINIUM DICHLORIDE
Donald M. Soignet, Metairie, and John B. McKelvey, New Orleans, La., assignors to the United States of America as represented by the Secretary of Agriculture
No Drawing. Filed May 25, 1967, Ser. No. 641,124
Int. Cl. C07d 51/70, 1/16; C07c 87/10
U.S. Cl. 260—268                     2 Claims

---

ABSTRACT OF THE DISCLOSURE

This invention relates to a novel process for the preparation of 1,1,4,4-tetraethylpiperazinium dichloride. More particularly, this invention relates to the preparation of 1,1,4,4-tetraethylpiperazinium dichloride in large quantities by a reaction between β-chloroethyldiethyl amine hydrochloride and some mono, di, or polyepoxide.

---

A non-exclusive, irrevocable, royalty-free license in the invention herein described throughout the world for all purposes of the United States Government, with the power to grant sublicenses for such purposes, is hereby granted to the Government of the United States of America.

A primary object of this invention is to provide an improved and novel process for the preparation of 1,1,4,4-tetraethylpiperazinium dichloride. A further object of this invention is to make this compound more efficiently and in near quantitative yields.

Several procedures for the preparation of 1,1,4,4-tetraethylpiperazinium dichloride are known in the prior art. These procedures, (a) treatment of β-chlorodiethyl amine hydrochloride with aqueous alkali, (b) isolation of the free amine by use of flake caustic and vacuum distillation followed by condensation of the free amine in water or alcohol, and (c) allowing a sample of the free amine to stand for a long period of time, are time consuming and give small yields of 1,1,4,4-tetraethylpiperazinium dichloride.

We have developed an improved and novel process for the preparation of 1,1,4,4-tetraethylpiperazinium dichloride that gives near quantitative yields. This new process involves the reaction between β-chloroethyldiethyl amine hydrochloride and some mono, di, or polyepoxide. This method of preparation involves a single step reaction which gives a quantitative yield of 1,1,4,4-tetraethylpiperazinum in a short period of time. Even though it is common knowledge that most epoxides will quickly remove HCl from an amine hydrochloride to form the free amine, the addition product form must furnish some catalytic effect because the free amine isolated by itself will form the cyclic dimer only after an extended period of time.

In general, in accordance with the present invention, we have utilized the property of epoxides to add hydrochloric acid by opening of the cyclic structure to form a chlorohydrin. β-chloroethyldietylamine will react with some mono, di, or polyepoxides to give the chlorohydrin and the free amine which can then undergo autocondensation to give the desired compound. The following equations show the probable course of the reaction:

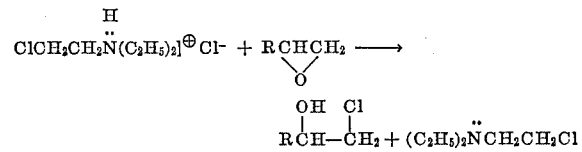

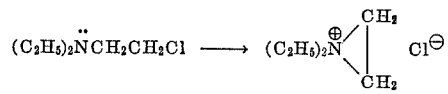

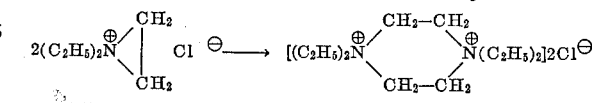

While simple monoepoxides have been found to give satisfactory yields and a liquid chlorohydrin in which the diquarternary product is insoluble, it will be obvious to those skilled in the art that a considerable number of di and polyepoxides might be used. Epoxides whose precursor chlorohydrins are solids are not suitable because of the difficulties encountered in the separation of the two solid products.

In the present invention, β-chloroethyldiethyl amine hydrochloride was recrystallized in absolute ethanol. The recrystallized amine hydrochloride was then dissolved in 50 ml. of absolute ethanol. An excess amount of reagent grade epoxide was then added and the mixture refluxed. After the reflux period, the reaction mixture was cooled to about −20° C. and filtered. The residue was dried and recrystallized in absolute ethanol.

EXAMPLE 1

16.7 g. (0.098 moles) of β-chloroethyldiethylamine hydrochloride, recrystallized in absolute ethanol, was dissolved in 50 ml. of absolute ethanol. 8 g. (0.111 moles) of reagent grade butylene oxide was added and the mixture was refluxed for one hour. After reflux, the reaction mixture was cooled to about −20° C. The mixture was filtered and the residue dried and recrystallized in absolute ethanol. The dried product gave a 96% yield and melted at 342° C. An analysis of the compound gave the following values: C, 53.13%; N, 10.33%; H, 10.32%; total Cl, 26.25% and ionic Cl, 25.91%. The theoretical values are: C, 53.14%; N, 10.33%; H, 10.33%; total Cl, 26.20% and ionic Cl, 26.20%.

The IR spectra did not show the presence of a C=C. This eliminates the possibility of

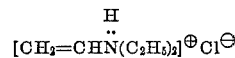

When the compound is dissolved in hot absolute ethanol which is made acidic by the addition of HCl, the product formed on cooling melts above 300° C. If the initial specie was the immonium ion, β-chloroethyldiethylamine hydrochloride would be regenerated and it would melt at 207° C. The high melting point obtained eliminates the possible immonium structure,

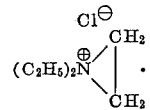

The NMR spectra showed a triplet at 1.23–1.55 p.p.m. (δ) with area 73, a quartet at 3.46–3.87 p.p.m. (δ) with area 59 and a singlet at 3.86–3.97 p.p.m. (δ) with area 37. There was some overlap of the quartet and the singlet which accounts for the deviation from thoretical values of area ratio which is 1:0.67:0.67 where 1 is the relative area at 1.23 p.p.m. and 0.67 at 3.46 p.p.m. The triplet at 1.23 is assigned to the CH₃ group of the ethyl specie, the quartet at 3.46 is the CH₂ groups of the ethyl specie and the singlet at 3.86 is the ring CH₂ groups.

EXAMPLE 2

17 g. (0.099 moles) of β-chloroethyldiethylamine hydrochloride was dissolved in 50 ml. of absolute ethanol and heated at 60° C. 10 g. (0.109 moles) of epichlorohydrin was added and the mixture was stirred for two hours while maintaining the temperature at 60° C. After two hours the reaction mixture was cooled to about −20° C. and filtered. The dried residue had a yield of 97% and possessed the same properties as the product from Example 1.

EXAMPLE 3

20 g. (0.117 moles) of β-chloroethyldiethylamine hydrochloride was dissolved in 180 g. (1.96 moles) of epichlorohydrin. The mixture was allowed to stand at room temperature for 5 hours. After 5 hours the reaction mixture was cooled to about −20° C. and filtered. The residue gave a yield in excess of 95% and possessed the same properties as the product in Example 1.

EXAMPLE 4

10 g. (0.059 moles) of β-chloroethyldiethylamine hydrochloride was dissolved in 190 g. (2.07 moles) of epichlorohydrin. The mixture was allowed to stand at room temperature for 4 hours. After 4 hours, the reaction mixture was cooled to about −20° C. and filtered. The residue gave a yield in excess of 95% and possessed the same properties as the product in Example 1.

EXAMPLE 5

17 g. (0.099 moles) of β-chloroethyldiethylamine hydrochloride was dissolved in absolute ethanol. 10 g. (0.109 moles) of epichlorohydrin is added and the mixture is allowed to stand for 54 hours. After 54 hours, the mixture was cooled to about −20° C. and filtered. The residue gave a yield of about 65% and possessed the same properties as the product in Example 1.

In order to show a utility for 1,1,4,4-tetraethylpiperazinium dichloride, the experiment described below was performed.

EXAMPLE 6

Aliquots of 0.1 N iodine solution were placed in a flask. To the flask is added solid 1,1,4,4-tetraethylpiperazinium dichloride. After a ten minute reaction period, the mixture was filtered and the filtrate titrated with a 0.1 N $Na_2S_2O_3$ solution using starch as an indicator. The results below show that 1,1,4,4-tetraethylpiperazinium dichloride can be used to quantitatively remove iodine from an aqueous solution.

| Sample No.: | Ml. of 0.1 N Iodine | Ml. of 0.1 N $Na_2S_2O_3$ |
| --- | --- | --- |
| 1 | 5 | None. |
| 2 | 5 | Do. |
| 3 | 10 | Do. |
| 4 | 10 | Do. |
| 5 | 20 | <1 drop. |
| 6 | 20 | Do. |

We claim:
1. A process for producing 1,1,4,4-tetraethylpiperazinium dichloride which process comprises the following steps:
(a) reacting about 1 part of β-chloroethyldiethylamine hydrochloride, dissolved in 50 ml. of absolute ethanol, with about 1.1 parts of butylene oxide for a period of about two hours and at a temperature of 60° C.,
(b) cooling the reaction mixture to about −20° C. and mechanically separating the 1,1,4,4-tetraethylpiperazinium dichloride.

2. A process for producing 1,1,4,4-tetraethylpiperazinium dichloride which process comprises the following steps:
(a) reacting about 1 part of β-chloroethyldiethylamine hydrochloride, dissolved in 50 of absolute ethanol, with about 1.1 parts of epichlorohydrin for a period of about two hours and at a temperature of 60° C.
(b) cooling the reaction mixture to about −20° C. and mechanically separating the 1,1,4,4-tetraethylpiperazinium dichloride.

References Cited

UNITED STATES PATENTS 2,918,464  12/1959  Caldwell _____ 260—268 X
3,074,937  1/1963  Cavallini _____ 260—268 X DONALD G. DAUS, Primary Examiner U.S. Cl. X.R.

260—348, 583, 633